US012785071B2

(12) United States Patent
Mendoza et al.

(10) Patent No.: US 12,785,071 B2
(45) Date of Patent: Nov. 3, 2026

(54) BATTERY PASTE ADHESION PROCESS FOR BATTERIES

(71) Applicant: Wirtz Manufacturing Company, Inc., Port Huron, MI (US)

(72) Inventors: Roel Mendoza, Palms, MI (US); Márcio Rocha, São Paulo (BR)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 20 days.

(21) Appl. No.: 19/118,172

(22) PCT Filed: Oct. 3, 2023

(86) PCT No.: PCT/US2023/034337
§ 371 (c)(1),
(2) Date: Apr. 3, 2025

(87) PCT Pub. No.: WO2024/076553
PCT Pub. Date: Apr. 11, 2024

(65) Prior Publication Data
US 2026/0128279 A1 May 7, 2026

Related U.S. Application Data

(60) Provisional application No. 63/412,589, filed on Oct. 3, 2022.

(51) Int. Cl.
*H01M 4/21* (2006.01)
*H01M 4/04* (2006.01)
*H01M 4/73* (2006.01)

(52) U.S. Cl.
CPC .......... *H01M 4/21* (2013.01); *H01M 4/0404* (2013.01); *H01M 4/73* (2013.01)

(58) Field of Classification Search
CPC ......... H01M 4/21; H01M 4/0404; H01M 4/73
See application file for complete search history.

(56) References Cited

U.S. PATENT DOCUMENTS 2,658,097 A * 11/1953 Orsino .................... H01M 4/22 423/89
3,867,200 A * 2/1975 Daniels, Jr. .......... B21D 31/043 72/203

(Continued)

FOREIGN PATENT DOCUMENTS

CN 1404171 A 3/2003
CN 108987678 A * 12/2018 ............ H01M 4/685

OTHER PUBLICATIONS

International Search Report for International Patent Application No. PCT/US23/34337 dated Mar. 5, 2024 (2 pages).

(Continued)

*Primary Examiner* — Nathan H Empie
(74) *Attorney, Agent, or Firm* — REISING ETHINGTON, P.C.

(57) ABSTRACT

A method of making substrates, such as grids, for assembly with lead-acid batteries is set forth herein. The grids can take the form of a strip of a multitude of serially-connected metal grids. The grids can ultimately be employed as positive electrodes or negative electrodes in a larger lead-acid battery assembly. Surfaces of the grids can be contacted with an aqueous solution, such as submergence in a bath thereof, as an example. The aqueous solution can comprise hydrogen peroxide.

10 Claims, 2 Drawing Sheets

(56) References Cited

U.S. PATENT DOCUMENTS

| | | | | |
|---|---|---|---|---|
| 4,643,959 A | | 2/1987 | Glötzl et al. | |
| 5,611,128 A | * | 3/1997 | Wirtz | H01M 4/73 29/623.5 |

OTHER PUBLICATIONS

Written Opinion for International Patent Application No. PCT/US23/34337 dated Mar. 5, 2024 (5 pages).

* cited by examiner

BATTERY PASTE ADHESION PROCESS FOR BATTERIES

CROSS-REFERENCE TO RELATED APPLICATION

This application claims the benefit of U.S. Provisional Ser. No. 63/412,589, with a filing date of Oct. 3, 2022, the contents of which are hereby incorporated by reference in their entirety.

TECHNICAL FIELD

This disclosure relates to batteries, and more particularly to cast and formed grids and substrates of battery plates and to the treatment of the surfaces thereof to improve adhesion of a subsequently applied battery paste.

BACKGROUND

Lead-acid batteries are assembled with a predetermined number of interposed positive and negative battery plates, each composed of a lead-based alloy grid and an electro-chemically-active leaded paste applied to the surfaces of the grid. The grid serves as the current conductor or current collector for the electrode and the applied paste serves as the active electrochemical material of the electrode. Lead-acid battery grids are formed with a frame (typically square or rectangular) enclosing integral transversely extending wires or wire segments to define a reticulated grid having open spaces between the wire segments. The grids are usually flat, quite thin (e.g., a few millimeters in thickness), and sized in accordance with an amount of a paste of active electrode material required for the specified electrical capacity of the electrode of the battery. The grids are usually coated on both sides with the paste so that the wire segments are embedded in and surrounded by the paste, and the paste fills the open spaces between the wire segments. The grids support the paste of active electrode material. The wire segments of the battery grids may be of varying cross-section and are sufficiently spaced apart so that the open spaces between the wire segments comprise a majority of the superficial surface area of the sides of the grids.

Lead-acid battery grids have been made by different manufacturing methods which often include the continuous casting of a sheet of the selected lead-based grid alloy. In one method, sheets may be cast between dies such that several interconnected (but readily separable) grid members are formed in substantially their finished shape. In a second method, flat sheets are cast of predetermined length and width and the sheets are cut, punched, and/or worked to form the crisscrossing wire segments. And in another process, the cast lead alloy sheet may be formed with suitable slits and subsequently drawn or stretched to form the frames and transverse wire segments.

In a fully charged lead-acid battery, the applied and cured active material paste of the negative plate (the anode during cell discharge) consists largely of lead particles (Pb), sulfuric acid, and water, and the active material paste of the positive plate (the cathode) consists largely of lead dioxide particles ($PbO_2$), sulfuric acid, and water. As cells of the battery are discharged, electrons are produced at the negative electrode plate which flow through the negative grid into an external electrical circuit, and the lead particles in the negative electrode paste are oxidized to lead sulfate ($PbSO_4$). As the flow of electrons through the circuit enter the positive electrode plate, the lead dioxide particles are electrochemically reduced to lead sulfate ($PbSO_4$). The reverse electrochemical reactions occur when the cells are recharged. As stated, in some instances, a suitable electrochemical connection should be obtained between the surfaces of the respective grid members and their coatings of a paste of active material.

SUMMARY

During the casting and subsequent forming and processing of lead alloy grids for lead-acid batteries, the surfaces of the casting and machining equipment are often coated with one or more of different lubrication or coolant materials composed of organic compounds. The purpose of the lubricating materials is to prevent or minimize adherence of the lead-based alloy grid material to the casting molds or to shape processing equipment. Sometimes, the lead alloy material is hot and tends to interact physically and chemically with the processing lubricant. Frequently the lubricants are composed of paraffin hydrocarbons derived from mineral oils or of unsaturated fatty acid compounds derived from vegetable oils. Frequently, these lubricant compositions are dispersed as colloids in other organic liquids and used as emulsions. Also, protective films of polytetrafluoroethylene materials (like Teflon®) may be used on the surface of the casting mold. Such materials (and other potential contaminants) adhere well to the surfaces of the lead-based grid materials, but when they are not substantially completely removed from the surfaces of the formed grid structures, it has been found, they can prevent good surface-to-surface contact with a subsequently applied, leaded paste in the formation of the plates for the lead-acid battery cells.

In accordance with an embodiment, surfaces of lead or lead-based alloy strips or of formed interconnected battery grids are suitably treated with an aqueous solution of hydrogen peroxide ($H_2O_2$). The concentration of the hydrogen peroxide solution, its temperature, and the time of its contact with the lead or lead alloy surface may be determined so as to (i) oxidize and remove all organic compounds from the surface, (ii) increase the surface area of the grid or lead strip by oxidation of the treated surface, and (iii) to facilitate the formation of alkaline lead compounds on the grid surfaces which enhance reaction with the tribasic and tetrabasic lead sulfate content of the paste subsequently applied to the grid in forming the cell plate. The hydrogen peroxide-oxidized lead-based alloy surface typically is characterized by the presence of lead hydroxide ($Pb(OH)_2$) and lead oxides (PbO and $PbO_2$).

Aqueous solutions of hydrogen peroxide are employed, per an embodiment, for the cleaning and oxidation of grid surfaces. However, in other embodiments, an aqueous solution of sodium perborate ($NaBO_3 \cdot nH_2O$) may be used, preferably at a temperature above about 60° C. In another embodiment, the grid surfaces may be cleaned and oxidized by prolonged contact with water vapor at a temperature of the order of about 120° C.-140° C. for a suitable period of time, greater than about two hours, per an example.

Thus, the surfaces of thin lead-based alloy grids, cast and formed using organic mineral oils or fatty acids as lubricants or coolants, may be cleaned of passivating surface coatings and oxidized by reaction with aqueous hydrogen peroxide solutions (or suitable alternatives, as described) to provide lead-based surfaces, containing lead oxides and hydroxides, that are more receptive to subsequently applied lead sulfate-containing pastes in the formation of lead-acid battery cells. As will be described below in this specification, in many lead-acid batteries, the pastes applied to grids for negative electrodes are of a different composition than the pastes applied to grids formed for positive electrodes. The use of the aqueous hydrogen peroxide suitably enables the different paste compositions.

Other embodiments and advantages of the oxidation process will be apparent from the following disclosures of non-limiting specific examples.

BRIEF DESCRIPTION OF THE DRAWINGS

The following detailed description of certain embodiments and best mode will be set forth with reference to the accompanying drawings, in which.

DETAILED DESCRIPTION

Figure 1:
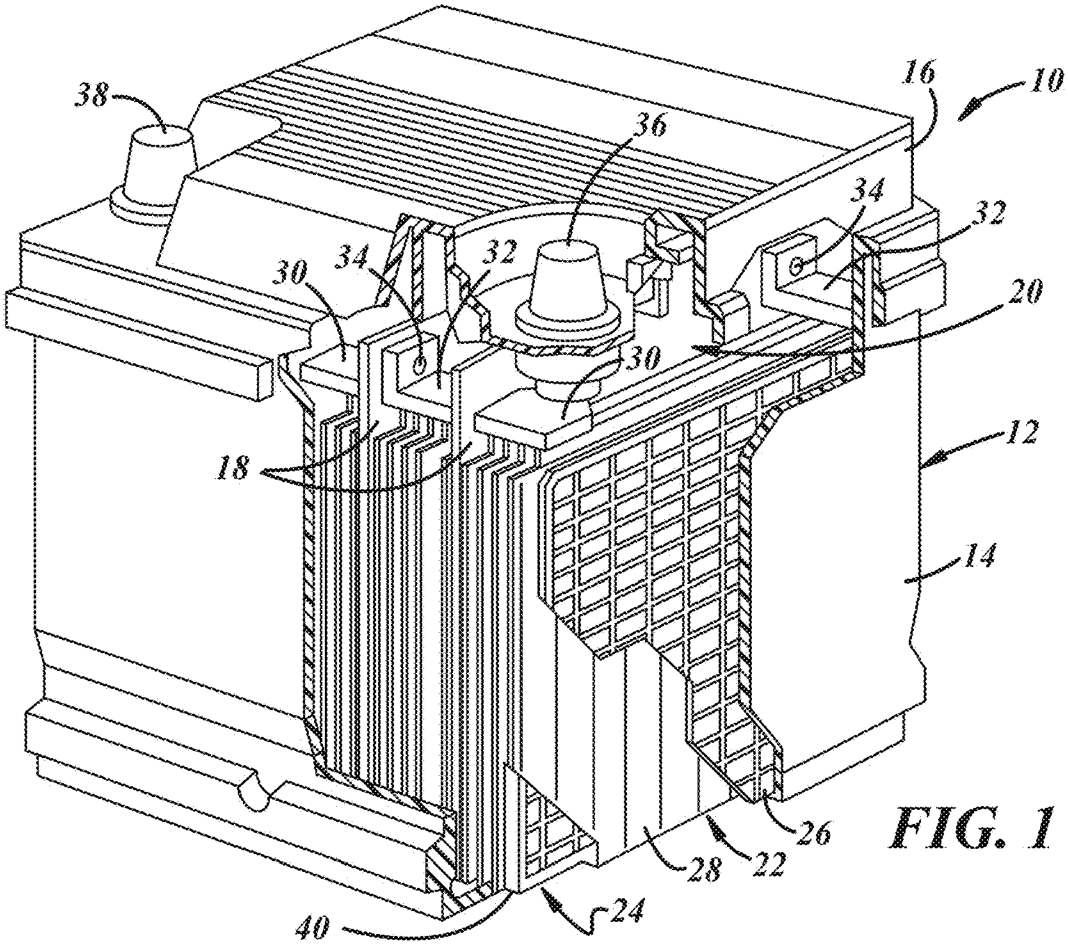
FIG. 1 is a perspective view of a lead-acid battery with a portion broken away and in section. The battery illustrated in FIG. 1 is representative of a lead-acid battery used in an automotive vehicle for engine starting, lighting, and combustion ignition.

Referring in more detail to the drawings, FIG. 1 illustrates a lead-acid battery 10 with a housing 12 having a case 14 and a top cover 16, both constructed from a plastic material such as polypropylene. The case 14 has a plurality of integrally molded battery cell dividers 18 forming a plurality of battery cell wells 20 within the housing 12.

A battery cell 22 is disposed within each of the wells 20 between the dividers 18 and has a set or book of interleaved positive plates 24 and negative plates 26, and a separator 28 disposed between each plate of different polarity to prevent them from touching and producing a short circuit within the cell 22. A positive plate strap 30 of lead and a negative plate strap 32 of lead electrically connect together the associated positive and negative plates 24, 26 of each cell 22 across the top of the plates. Still, in other embodiments, the lead-acid battery 10 could have other architectures with other designs, constructions, and/or components. In an embodiment, for instance, the lead-acid battery 10 is a bipolar battery with current collectors in the form of bipoles and secondary carriers of paste material such as absorbent glass mats (AGMs).

To connect the individual cells 22 together in series, an intercell connector 34 of lead is disposed between and welded to the positive plate strap 30 and adjoining negative plate strap 32 of adjoining cells 22 in series. A positive terminal post 36 of lead is connected to the positive plate strap 30 of the first cell and a negative terminal post 38 of lead is connected to the negative plate strap 32 of the last cell. Each post 36, 38 projects through the cover 16 and is sealed to the cover and welded to its associated strap 30, 32. A dilute sulfuric acid solution fills the majority of the remaining space within each well 20 and is the electrolyte for chemical reactions which take place within each battery cell 22.

Figure 2:
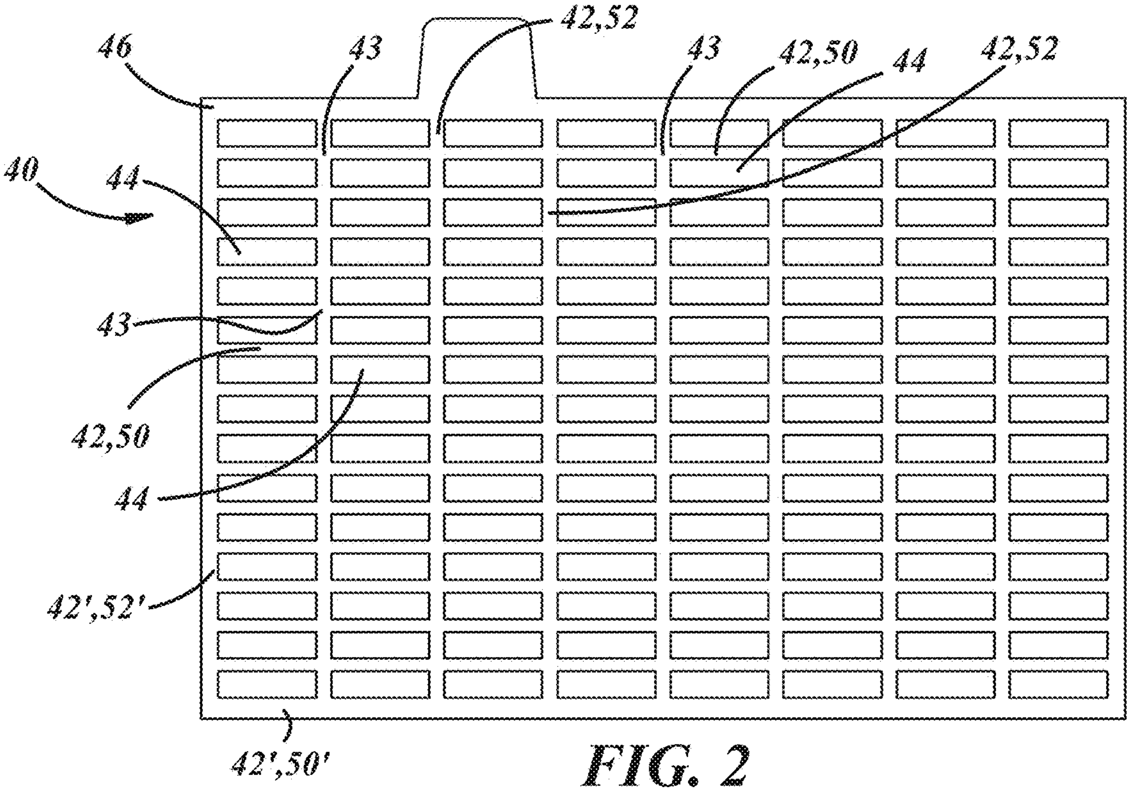
FIG. 2 is a plan view of one exemplary form of a cast and shaped battery grid used in a lead-acid battery such as the battery illustrated in FIG. 1.

As noted above, each set or book of battery plates 24, 26 preferably includes a plurality of positive plates 24 and a plurality of negative plates 26. Each of the positive and negative plates 24, 26 includes a battery grid 40 covered and preferably embedded in an electrochemically active material that is usually applied to the grids 40 in the form of a paste (not illustrated in FIG. 1). FIG. 2 illustrates an exemplary grid structure. Each grid 40 may include a substantially planar web including a frame 42' and a plurality of lead wire segments 42 that may be encompassed by the frame 42' with at least some of the wire segments 42 intersecting each other at nodes 43 and defining open spaces 44 between adjacent wire segments 42. The grids 40 are generally flat and planar, and have a first substantially planar surface 46 and an opposed substantially planar surface on the hidden back side of the grid 40 illustrated in FIG. 2.

The battery grid 40 may be of any suitable composition, for example a lead-based alloy containing relatively small additions of calcium, tin, and silver. The specific compositions may vary somewhat for different applications and between positive and negative grid compositions. In one example, to illustrate relative proportions of a grid alloy, the calcium content may be 0.025 to 0.06 parts-by-weight (pbw) (0.005 TO 0.12%) the tin content may be 0.3 to 0.7 pbw (0.05 TO 20)%) the silver content may be about 0.015 to 0.045 pbw, and the balance lead.

In an exemplary form of the battery grid 40 shown in FIG. 2, the wire segments 42 may be defined by a plurality of generally horizontal or longitudinally extending lead wire segments 50, and a plurality of generally vertical lead wire segments 52 intersecting and joined with the horizontal wire segments 50. Similarly, the frame 42 may be defined by generally horizontal or longitudinally extending frame segments 50' and generally vertical frame segments 52'. The horizontal wire segments 50 are spaced apart from each other, and the vertical wire segments 52 are likewise spaced apart from each other defining a generally reticulated framework.

The wire segments 50, 52 and frame segments 50', 52' may be of any desired shape, orientation, spacing, and the like. For example, the vertical wire segments 52 may instead zigzag so they are not perpendicular to the horizontal wire segments 50 such that the open spaces 44 are parallelograms. As a further example, any of the horizontal or vertical wire segments 50, 52 can be angled or curved, and the open spaces 44 may have any shape. Also, the wire segments 42 may define planar surfaces that are substantially parallel and flush with respect to corresponding planar surfaces of the frame segments 42' to define a coplanar surface 46 on the upper side of the grid 40 and on its hidden opposite side. In another embodiment, the wire segments 42 may define planar surfaces that are recessed from corresponding planar surfaces of the frame segments 42'.

The grid 40 may be manufactured by various processes including, by way of example and without limitation, continuous casting of a grid strip and then rolling the grid strip, or continuous casting of a solid strip and then rolling the solid strip followed either by a punching operation or a piercing and pulling operation to define a grid. Exemplary grid and plate manufacturing processes and tooling are disclosed in U.S. Pat. Nos. 6,895,644, 6,279,224, 4,606,383, 4,349,067, and 4,079,911 of the assignee hereof, the disclosures of all of which are incorporated herein by reference in their entireties.

The lead-based alloy and corresponding grid structures, selected for the positive and negative battery electrodes, are each suitably coated with a paste composition (to form "plates") before assembly into a battery. The paste coating is not shown on the grid illustrated in FIGS. 1 and 2 because the applied paste fills the spaces 44 between the wires of the grid and coats and covers the surfaces of wires and frame segments of each grid. However, the paste coating on each grid is the active electrochemical material for the electrode member (the plate). And the paste must suitably interact electrochemically with the surface of the grid to which it has been applied.

As an example, the initial paste composition for positive plates may comprise a mixture of lead oxide particles (with some lead particles), water and sulfuric acid. After application to the positive grids, the pastes are dried. The plates may then be processed in a steam chamber for several hours and in a curing room for several days. The initial positive plate powder mixture then typically contains lead sulfate ($PbSO_4$) and a mixture of basic lead sulfates, for example, $PbO{\cdot}PbSO_4$, $3PbO{\cdot}PbSO4{\cdot}H_2O$, and $4PbO{\cdot}PbSO_4$. These reactions occur with the initial paste layer in contact with the surface of a positive grid. And in this embodiment, the surface of the formed grid is exposed to an aqueous solution of hydrogen peroxide and with atmospheric air. The grids that have undergone hydrogen peroxide treatment are ready to receive a lead and sulfuric acid (lead sulfate) paste and become positive or negative plates. After curing these plates are ready for assembly into a cell of a battery and for later charging of the battery.

As an example, the negative plates of the lead-acid battery may be formed from a different paste mixture because lead particles (often spongy) are formed and used in the negative electrodes of the battery. In addition to the lead oxide particles, sulfuric acid, and water used in the positive plate paste, the negative plate paste may also contain a small amount (e.g., up to about two percent by weight of the paste mixture) of a sulfuric acid-resistant polymer, such as polyvinylpyrrolidone or polyvinyl alcohol. A small amount of carbon black may be added to compensate for the electrically insulating effect of the polymer. The negative plate paste mixture may also contain a small amount of a commercially available mixture that serves as an expander in the cured paste of the negative plate. An example of a suitable expander composition is a mixture comprising carbon black, barium sulfate, and a lignosulfonate. The negative battery paste mixture is carefully applied to the opposing surfaces of each negative grid to form the negative plates. The negative plates are dried, steamed and cured to form the lead sulfates in the paste portions of the plates. During battery charging and recharging, the composition of the paste must engage the surfaces of its grid to enable the reversible lead particle to lead sulfate reactions at the surfaces of the negative grids and within the negative plate material.

Thus, having described the interaction of the grid surfaces and the applied paste materials, the discussion returns to the use of aqueous hydrogen peroxide solutions to clean and oxidize the surfaces of the and shaped grids intended for both positive and negative plates. Because of the large volume of lead-acid batteries produced each year for automotive and other applications, there are commercially available equipment and processes for producing large volumes of the components of such batteries. There are commercially available casting equipment and forming equipment for the continuous production of sheets of interconnected positive grids and negative grids for the electrodes of lead-acid batteries. For example, the assignee of this application produces equipment for the continuous casting of sheets of interconnected positive grids or negative grids for battery electrodes. In one example, the connected grids may be continuously cast in sheets of uniform width and thickness which are characterized by two or three separable grids across the width of the sheet and having frames and wire configurations like the grid illustrated in FIGS. 1 and 2 of this specification. The sheet contains many crosswise rows of separable grids along the length of the continuous sheet. In many such processes, the thin, lead-based alloy sheets have been continuously cast and formed using lubricating or coolant compositions of mineral oils, fatty acids, and or fluorinated hydrocarbons. These lubricants and coatings contribute to the casting and forming processes, but residual adherent coatings produced during the casting or shaping are formed on the surfaces of the interconnected grids which often interfere with the function of a subsequently applied paste material. The purpose of the subject cleaning and oxidation process is to remove such processing materials remaining on grid surfaces and, further, to oxidize some of the lead or lead-based alloy on the grid surface to form films of lead hydroxide and/or lead oxide.

Figure 3:
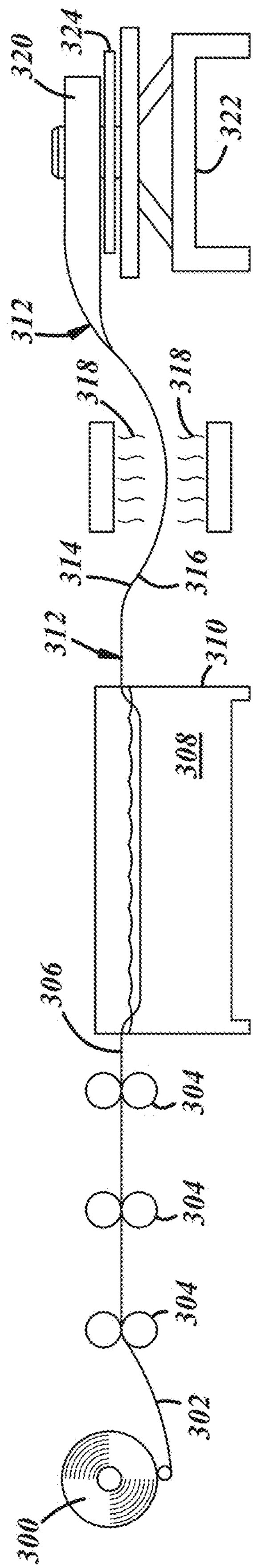
FIG. 3 is a schematic process flow diagram illustrating the cleaning and oxidation of a continuous sheet of cast and formed, removably inter-connected, lead-based alloy grids for positive lead-acid battery electrodes. In this embodiment, the sheet of interconnected positive grids is unwound from a wound spool of the interconnected grids and conducted through a set of rolls to reduce the thickness of the positive grids. The rolled sheet is then directed through a bath consisting of aqueous hydrogen peroxide for cleaning and oxidation of the opposing surfaces of the sheet of grids. The cleaned and oxidized sheet of grids is then dried in air, and then twisted and re-wound into a spool preparatory to subsequent processing of the grids into plates for positive electrodes.

In FIG. 3 a continuous process is illustrated in which a rolled spool 300 of just-formed, continuously-cast sheet 302 of interconnected, lead-based alloy positive grids has been formed by a casting process using ConRoll® commercially-available equipment. This is but one example embodiment. Typically, a spool will contain about 30,000 interconnected grids. The temperature of the rolled material may be at an ambient temperature. In one practice of forming positive grids, the cast sheet 302 with its cross-wise and length-wise inter-connected grids may be formed with a slightly larger diameter than the intended final grid structure. Thus, in FIG. 3, the unwound sheet 302 is continually advanced between one or more pairs of rollers 304 in a ConRoll® process to reduce the thickness of the sheet 306 of interconnected positive grids to their intended shape and thickness.

The rolled sheet 306 of interconnected positive grids now may have a width of, for example, about eighteen inches and thickness of about 1-4 millimeters. The sheet 306, now slightly above an ambient temperature, is continually drawn through a bath 308 of an aqueous solution of hydrogen peroxide in a supported container 310. The aqueous solution consists essentially of 5 volume percent to 65 volume percent of hydrogen peroxide in water. The temperature of the aqueous hydrogen peroxide solution is suitably in the range of about 25° C. to 60° C., and preferably no higher than 70° C. The time of exposure of the sheet to the hydrogen peroxide solution depends in part on the amount of lubricant residue on the surfaces of the sheet of formed grids and the temperature of the sheet and solution. But the hydrogen peroxide solution is also used to oxidize the surfaces of the sheet of interconnected lead based alloy grids to form a thin film of lead hydroxide and/or lead oxides on the surfaces of each grid. Typical treatment times of the sheets in the peroxide solutions are of the order of a few seconds up to about one minute. In one specific example, eight seconds of exposure worked suitably. But the exposure time is determined for each cast and formed sheet in order to obtain the desired cleaning and oxidation result.

Still referring to FIG. 3, as an oxidized portion of the continuous sheet 312 leaves the hydrogen peroxide solution 308, it is dried in air. A pressurized stream of warmed air (indicated by arrows 318) may be directed against the upper 314 and lower surfaces 316 of the cleaned and oxidized sheet 312 to dry the treated grid surfaces and to enhance the oxidation process. The oxidized surfaces of the interconnected positive grids in the sheet are thus prepared to receive a coating of an intended paste composition for the positive grids.

The oxidized and dried sheet 312 may then be re-rolled into a coil 320 for transfer as necessary to a paste application worksite. In the illustration of FIG. 3, the flowing horizontally aligned sheet is twisted for winding into a visible vertical spool roll 320 supported on a support surface 322 with a rolling device 324 to receive and wind the cleaned and oxidized sheet 312 of interconnected positive grid members.

Figure 4:
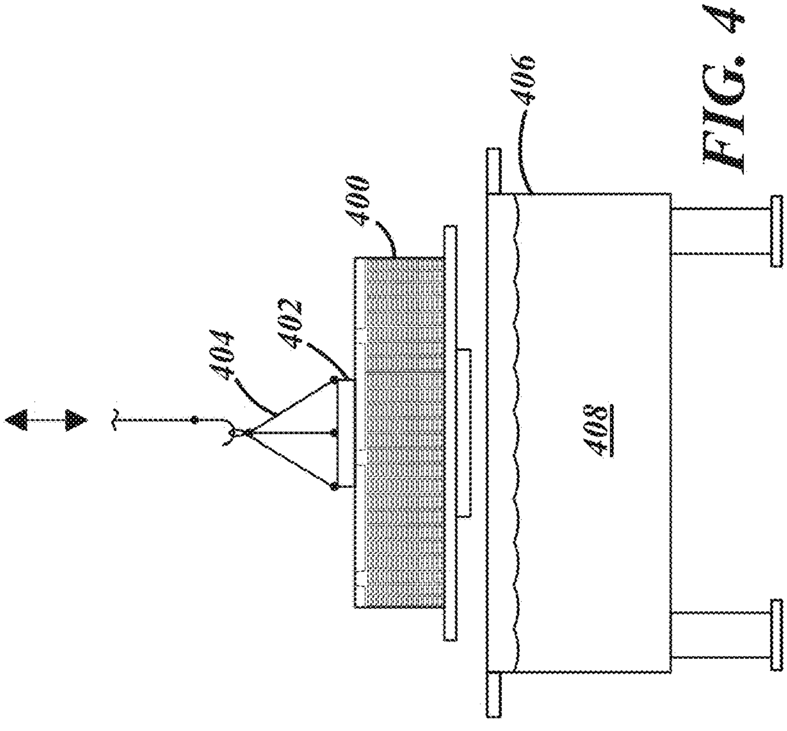
FIG. 4 is a schematic illustration of the lowering of a wound spool of a continuous sheet of interconnected continuously cast grid members into a bath consisting of aqueous hydrogen peroxide for cleaning and oxidation of the grid members. The openings in the connected grid members permit the hydrogen peroxide solution to reach the surfaces of the grids within the rolled spool.

In FIG. 4, a batch process is illustrated for cleaning and oxidizing the surfaces of a rolled sheet of interconnected cast and formed lead-based alloy grids for a lead-acid battery. A rolled spool of a sheet of the grids 400, secured by a circumferential porous support band 402 (shown in cross-section in FIG. 4), which in turn is carried by a wire and cable system 404, is immersed in a stationary container 406 filled with a bath 408 consisting of a solution of hydrogen peroxide in water. The concentration of the hydrogen peroxide solution and the temperature of the bath 408 are suitably determined as described above in this specification. The spool of preformed grids 400 is porous and the hydrogen peroxide solution suitably penetrates the spool to clean and oxidize the surfaces of each interconnected grid in the spool. When the rolled spool of the sheet material of interconnected grids 400 is removed from the bath 408, warmed compressed air at a suitable temperature is blown through the sheet material to dry and enhance the oxidization of the surface of the grids.

Figure 5:
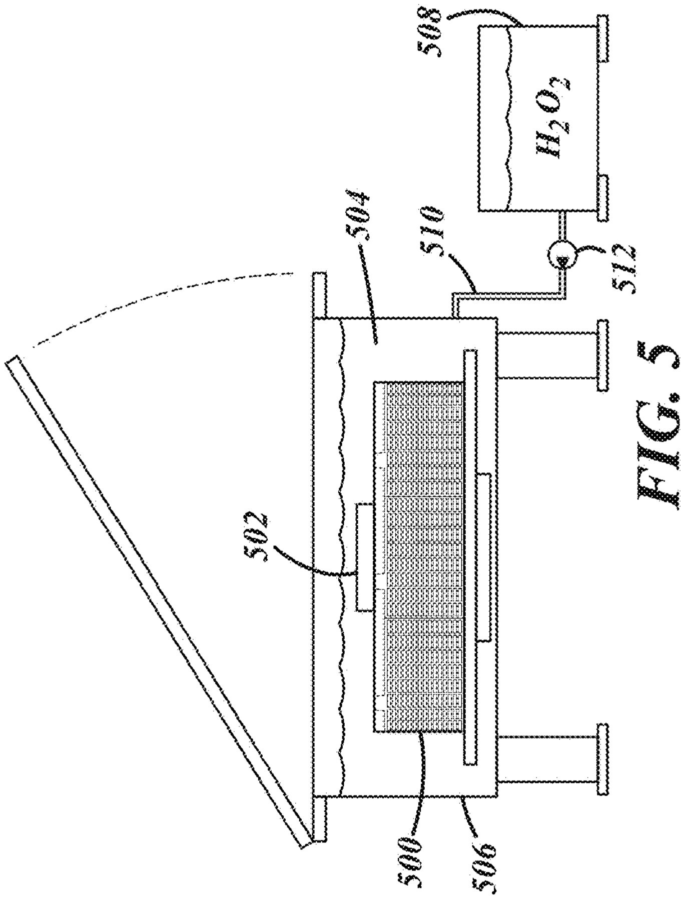
FIG. 5 is a schematic illustration of a supported tank containing a supported spool of a sheet of preformed connected grid members. The rolled sheet of grid members is immersed in a bath of aqueous hydrogen peroxide. The hydrogen peroxide solution can be continuously circulated from an external vessel into and out of the cleaning and oxidation vessel.

FIG. 5 illustrates a different embodiment of the cleaning and oxidation process illustrated in FIG. 4. In FIG. 5, a rolled spool of a sheet of interconnected cast and formed grids 500, initially secured for carrying by a circumferential porous support band 502 has been placed in an aqueous hydrogen peroxide solution bath 504 contained in an elevated closable vessel 506. The hydrogen peroxide solution is supplied from a side container 508 of the solution through conduit 510 using a circulation pump 512. The hydrogen peroxide solution is returned from the treatment vessel 506 to the supply container 508 through a suitable return line. The circulation of the hydrogen peroxide solution is used to circulate the cleaning and oxidation medium through the openings in the interconnected grid structures in the roll of formed grids 500.

The concentration of the hydrogen peroxide solution and the temperature of the bath 504 are suitably determined as described above in this specification. The spool of preformed grids 500 is porous and the circulated hydrogen peroxide solution suitably penetrates the roll to clean and oxidize the surfaces of each interconnected grid in the roll. When the roll of the sheet of interconnected grids 500 is removed from the bath 504, compressed air at a suitable temperature is blown through the roll of grids 500 to dry and enhance the oxidization of the surface of the grids.

As used herein, the terms "general," "generally," "approximately," and "substantially" are intended to account for the inherent degree of variance and imprecision that is often attributed to, and often accompanies, any design and manufacturing process and measurement, including engineering tolerances, and without deviation from the relevant functionality and intended outcome, such that mathematical precision and exactitude is not implied and, in some instances, is not possible.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of forming a group of plates for cells of a lead-acid battery, the method comprising:
- forming a lead or a lead-based alloy sheet layer of interconnected, but separable, grids for the positive electrodes or the negative electrodes of lead-acid batteries, the sheet layer being formed using a casting process, or the combination of a casting process and a subsequent step of machine shaping of a cast sheet, the forming steps utilizing a carbon-containing lubricant such that a residue of the lubricant remains on surfaces of the sheet layer of interconnected grids;
- contacting the surfaces of the sheet layer with an aqueous solution consisting essentially of hydrogen peroxide in water so as to remove the lubricant residue from the surfaces of the sheet layer of interconnected grids and to oxidize the lead or lead-based alloy grids, the oxidized surfaces of the grids being characterized by the presence of at least one of lead hydroxide and a lead oxide;
- drying the surfaces of the sheet using atmospheric air; and
- applying a paste of precursors of active electrode material to the oxidized grid surface.

2. A method as stated in claim 1 in which the carbon-containing lubricant used in the forming of the grid comprised at least one of a paraffin hydrocarbon, an unsaturated fatty acid, and a fluorinated hydrocarbon.

3. A method as stated in claim 1 in which the surfaces of the sheet layer are contacted with an aqueous solution consisting essentially of hydrogen peroxide and the concentration of the solution of hydrogen peroxide in water is in the range of five to sixty five percent by volume and the grid surfaces are exposed to the solution at a temperature in the range from about 25° C. to a temperature no greater than about 70° C.

4. A method as stated in claim 1 in which the oxidized sheet, following its treatment with aqueous hydrogen peroxide solution, is dried in a stream of flowing air.

5. A method as stated in claim 1 in which the paste applied to the oxidized and dried sheet comprises lead oxide particles, lead particles, sulfuric acid, and water and the applied paste is steamed and reacted with the oxidized surface of the grid.

6. A method as stated in claim 5 in which the paste applied to the oxidized and dried sheet further comprises a polymer and an expander.

7. A method as stated in claim 1 in which the contacting includes passing the sheet through a bath of the aqueous solution of hydrogen peroxide.

8. A method as stated in claim 1 in which the contacting includes immersing a roll of the sheet layer in an agitated bath of the aqueous solution of hydrogen peroxide.

9. A method as stated in claim 1 in which the initial sheet layer of interconnected grids is formed as a wound spool.

10. A method as stated in claim 1 in which the initial sheet layer of interconnected grids is formed as a wound spool containing at least 30,000 interconnected grids.

* * * * *